United States Patent
Wang et al.

(10) Patent No.: US 7,374,731 B2
(45) Date of Patent: May 20, 2008

(54) REACTION APPARATUS FOR PRODUCING VAPOR-GROWN CARBON FIBERS AND CONTINUOUS PRODUCTION SYSTEM THEREOF

(75) Inventors: Chun-Shan Wang, Tainan Hsien (TW);
Ya-Jen Huang, Tainan Hsien (TW);
Yen-Chu Tan, Tainan Hsien (TW);
Kai-Jen Ko, Tainan Hsien (TW);
Shih-Peng Yang, Tainan Hsien (TW)

(73) Assignee: Yonyu Plastics Co., Ltd., Tainan (TW)

( * ) Notice: Subject to any disclaimer, the term of this patent is extended or adjusted under 35 U.S.C. 154(b) by 480 days.

(21) Appl. No.: 11/217,371

(22) Filed: Sep. 2, 2005

(65) Prior Publication Data

US 2007/0051313 A1    Mar. 8, 2007

(51) Int. Cl.
*B01J 19/00* (2006.01)
*D01F 9/12* (2006.01)
*D01F 9/133* (2006.01)
*C23C 16/00* (2006.01)
*B01D 47/00* (2006.01)

(52) U.S. Cl. .................. 422/198; 422/130; 118/719; 977/842; 977/844; 977/846; 977/891; 55/338

(58) Field of Classification Search ............. 422/130; 118/719; 423/447.3, 447.2; 55/338; 977/891, 977/846, 844, 842

See application file for complete search history.

(56) References Cited

U.S. PATENT DOCUMENTS

| | | | |
|---|---|---|---|
| 5,695,818 A | * | 12/1997 | Soffer et al. ............. 427/248.1 |
| 6,878,560 B1 | * | 4/2005 | Rangarajan et al. .......... 438/14 |
| 2005/0104044 A1 | * | 5/2005 | Kambara et al. ........... 252/500 |

* cited by examiner

*Primary Examiner*—Walter D. Griffin
*Assistant Examiner*—Natasha Young
(74) *Attorney, Agent, or Firm*—Rosenberg Klein & Lee

(57) ABSTRACT

A reaction apparatus for producing vapor-grown carbon fibers (VGCF) and a continuous production system for producing VGCF are disclosed. The VGCF reaction apparatus is featured in installing a plurality of holes on the upper portion of inner tubes; and filling thermally conductive material in the areas between the inner tubes and the outer tube. The continuous production system includes the reaction apparatus, a product collection system and a carrier-gas collecting system, wherein carbon fibers produced by the reaction apparatus fall into the product collection system, and in the product collection system, a collection bin fullloaded with carbon fibers is pushed out and an empty bin is pushed into the collection chamber under PLC control as well as atmosphere replacement with inert gas, thereby continuously producing VGCF.

20 Claims, 10 Drawing Sheets

REACTION APPARATUS FOR PRODUCING VAPOR-GROWN CARBON FIBERS AND CONTINUOUS PRODUCTION SYSTEM THEREOF

FIELD OF THE INVENTION

The present invention relates to a reaction apparatus for producing vapor-grown carbon fibers (VGCF) and a production system for producing the same, and more particularly, to the VGCF reaction apparatus and continuous production system that can prevent carbon fibers from attaching to inner tube walls with high thermal conduction efficiency.

BACKGROUND OF THE INVENTION

VGCF has excellent material properties of a unique onion-ring micro-structure, a high aspect ratio, a high thermal-conductive coefficient, a low thermal-expansion coefficient, high strength, high elasticity and high corrosion resistance. In addition, carbon fibers made by the vapor-growing method can have the structure similar to the single-crystal graphite structure, thereby forming excellent multi-wall carbon tubes having excellent electrical conductivity, wherein the thermal conductivity thereof is better than that of the thermally-conductive material such as copper or aluminum. The success of VGCF study has added quite an important product to the carbon fiber industry in which OPCF (Organic Precursor Carbon Fibers) such as PAN, Pitch carbon fibers have been the major products for quite a long time.

The VGCF production process mainly uses low boiling hydrocarbon compounds as raw material (carbon source) having pyrolysis reaction in reductive carrier gas (H2) atmosphere, thus directly forming VGCF via the special catalysis of transition metals such as iron, nickel or cobalt in nano-particles thereof as nucleation, wherein the reaction temperature is between 800° C. and 1300° C. The VGCF fabrication process has the advantage that the fabrication skill is simple and does not need to perform the steps of spinning, pre-oxidation, carbonization, etc. required in the OPCF fabrication process, so that the VGCF fabrication process can form carbon fibers directly from cheap low-boiling hydrocarbon material via pyrolysis and catalysis.

Referring to FIG. 1A and FIG. 1B, FIG. 1A and FIG. 1B are schematic diagrams showing conventional VGCF reaction apparatuses respectively, wherein a conventional VGCF reaction apparatus is composed of tubular reactor and a heater 50, and the tubular reactor can be formed solely from an outer tube 40 (such as shown in FIG. 1A) or from an inner tube 30 inserted into the outer tube 40 (such as shown in FIG. 1B).

Such as the tubular reactor shown in FIG. 1A, raw material gas enters the outer tube 40 via an guide tube 10 mounted on one end of the outer tube 40, and the heat generated by the heater 50 is passes through the outer tube 40 to the gas mixture of the raw material gas and carrier gas for increasing the temperature of the gas mixture, thereby pyrolyzing the raw material gas to form carbon fibers. Thereafter, the carbon fibers generated fall into a collection bin 60. However, in the aforementioned process, the temperature near the tube wall is quite higher than the central area of the reaction tube and the situation becomes worse when the reactor diameters increase, so that aforementioned process is merely suitable for use in the tubular reactors with small diameters and is not suitable for mass production. Meanwhile, there are carbon fibers frequently attached to the tube wall, thus lowering productivity, and the reaction often needs stopping for cleaning, thus disadvantaging continuous production.

Such as the tubular reactor shown in FIG. 1B, raw material gas enters the outer tube 40 via a guide tube 10, and carrier gas (H$_2$) enters the outer tube 40 via a gas inlet 20 mounted on one end of the outer tube 40, and inert gas enters from the bottom of the outer tube 40 as guide gas. After mixing, the raw material gas, and the carrier gas enter the inner tube 30, wherein the heat generated by the heater 50 is passed through the outer tube 40 to the inner tube 30 and then to the gas mixture of the raw material gas, the carrier gas and inert gas for increasing the temperature of the gas mixture, thereby enabling the raw material gas to be pyrolyzed to form carbon fibers. Thereafter, the carbon fibers generated fall into a collection bin 60. Generally, the inert gas passing between the inner tube 30 and the outer tube 40 is used as guide gas for reinforcing the heat transfer efficiency between the inner tube 30 and the outer tube 40. However, since the thermal conductive coefficient of the guide gas is not large, the heating efficiency of the heater 50 on the gas mixture is not good, and the energy provided by the heater 50 thus cannot be well utilized, and the VGCF formed from carbon source under inert atmosphere is inferior to that formed under pure reductive atmosphere (H$_2$). Further, there are carbon fibers frequently attached on the tube wall of the inner tube 30 in the conventional tubular reactor, thus lowering productivity and disadvantaging continuous production due to frequent tube wall cleaning.

On the other hand, a conventional continuous production system for producing VGCF is mainly composed of a gas-supplying apparatus, a tubular reactor and a collection bin. After the carbon fibers generated fall into a collection bin and fill up the collection bin, the reaction has to be first stopped, and then a gas-swapping step is performed for replacing the carrier gas (H$_2$) in the collection bin with inert gas (such as nitrogen) so as to prevent carrier gas from resulting in explosion. Thereafter, the collection bin is moved out and replaced with another empty collection bin. Then, after the air in the empty collection bin is expelled and replaced with inert gas, the carrier gas is introduced into the reaction system for starting another reaction cycle. Therefore, the conventional continuous production system has the following disadvantages. Besides replacing the collection bin and the atmosphere therein, a lot of manpower have to be consumed and further the reaction system has to be stopped for quite a period of time, thus resulting production interruption and lower productivity; and there is no carrier-gas recycling system, not only resulting in pollution but also increasing production cost.

Hence, there is a need to develop a reaction system for producing VGCF in a continuous manner, thereby effectively utilizing the energy provided by the heater; preventing carbon fibers from attaching to the tube wall of the inner tube; continuously collecting products (VGCF) without stopping the reaction apparatus; and effectively recycling carrier gas, thus increasing productivity; easily cleaning the reaction tubes; preventing pollution and workforce waste; and lowering production cost.

SUMMARY OF THE INVENTION

An aspect of the present invention is to provide a reaction system for producing VGCF with effective utilization of the energy provided by a heater, thereby lowering production cost.

Another aspect of the present invention is to provide a reaction apparatus for producing VGCF by directing carrier gas to the center of reaction tube so as to increase the efficiency for mixing carrier gas and raw material gas and to prevent carbon fibers from forming on the tube wall, thereby increasing productivity and saving time of cleaning the reaction tubes.

Another aspect of the present invention is to provide a reaction apparatus for producing VGCF for effectively utilizing the overall heating capacity and forming an excellent effect in which gas is cooled on both ends of the reaction tube and heated with reaction at the central portion of the reaction tube.

Another aspect of the present invention is to provide a reaction apparatus for producing VGCF and a continuous production system for producing the same, thereby continuously collecting products (VGCF) without stopping the reaction apparatus for increasing productivity.

Another aspect of the present invention is to provide a reaction apparatus for producing VGCF and a continuous production system for producing the same, thereby effectively recycling the carrier gas for preventing pollution and lowering production cost.

According to the aforementioned aspects, a reactor for producing VGCF is provided. According to an embodiment of the present invention, the reactor comprises a vertical tubular reactor and a heater, wherein the vertical tubular reactor is composed of an outer tube and an inner tube. The inner tube is located inside the outer tube, and the top end of the inner tube has a guide tube mounted thereon for introducing reaction gas, and a thermal-conductive material is filled between the inner tube and the outer tube. The inner tube is divided into upper and lower inner tubes via a division plate, wherein the upper inner tube is a first inner tube, and the lower inner tuber is a second inner tube. One end of the first inner tube is aligned with one end of the outer tube, and there are a plurality of first holes distributed on the tube wall of the first inner tube, and there is an gas inlet between the first inner tube and the outer tube for introducing a second carrier gas to cool down the upper end of the outer tube and the first inner tube. The second inner tube is located below the first inner tube in the outer tube, wherein there are a plurality of second holes distributed on the tube wall of an upper portion of the second inner tube, and the thermal-conductive material is filled in a filler portion extending from the area between the first inner tube and the outer tube to the area between the second inner tube and the outer tube, and the length of the filler portion corresponding to the second inner tube is greater than the length of the second holes corresponding to the second inner tube. The outer tube has a second gas inlet located on below the thermal-conductive material for introducing first carrier gas. Further, both ends of the heater are respectively spaced from both ends of the outer tube at a first predetermined distance and a second predetermined distance, and the heater is corresponding to a portion of the first inner tube and a portion of the second inner tube, thereby heating a portion of the outer tube.

Moreover, according to the aforementioned aspects, a continuous production system for producing VGCF is provided. The continuous production system comprises the aforementioned reactor, a product-collecting system and carrier-gas collecting system, wherein reaction gas formed by mixing raw material gas (including carbon source and catalyst) with carrier gas is introduced into the reactor for producing the VGCF via pyrolysis with residual reaction gas remaining. The product-collecting system is connected to the lower end of the second inner tube in the aforementioned reactor for continuously collecting the VGCF by using a dry-collection method. The product-collecting system comprises: a circulating rooms set and a collection-bins set. The circulating rooms set is divided into an air atmosphere area and an inert atmosphere area, and the collection-bins set has a plurality of bins, wherein the bins move circulatively in the air atmosphere area and the inert atmosphere area. Moreover, the carrier-gas collecting system is connected to the product-collecting system for collecting and purifying recyclable carrier gas from the effluent gas expelled from the product-collecting system by using a water-washing vessel. The carrier-gas collecting system comprises a water-washing vessel, wherein a water flow is introduced into the water-washing vessel for washing the effluent gas so as to obtain a residual product and the recyclable carrier gas.

Further, the product-collecting system further comprises a circulating rooms set, a first gate, a second gate, a third gate, a fourth gate, a collection-bins set, a first push-equipment set, a second push-equipment set and a gas-swapping apparatus.

Further, the circulating rooms set is divided into a first air-atmosphere sub-area, a second air-atmosphere sub-area and a third air-atmosphere sub-area; and a first inert-atmosphere sub-area, a second inert-atmosphere sub-area and a third inert-atmosphere sub-area each having an inert atmosphere, wherein both opposite sides of the second air-atmosphere sub-area are open respectively to the first air-atmosphere sub-area and the third air-atmosphere sub-area, and the second inert-atmosphere sub-area is isolated from the second air-atmosphere sub-area, and the second inert-atmosphere sub-area is open to the reaction apparatus for collecting the VGCF.

Further, the first gate is mounted between one side of the second inert-atmosphere sub-area and the first inert-atmosphere sub-area; and the second gate is mounted between the third inert-atmosphere sub-area and the other side of the second inert-atmosphere sub-area opposite to the first inert-atmosphere sub-area, wherein the first gate and the second gate are opened simultaneously. The third gate is mounted between the first inert-atmosphere sub-area and the first air-atmosphere sub-area; and the fourth gate is mounted between the third inert-atmosphere sub-area and the third air-atmosphere sub-area, wherein the third gate and the fourth gate are opened simultaneously.

Further, the collection-bins set moves circulatively in the circulating rooms set, wherein the collection-bins set is composed of a first bin, a second bin adjacent to the first bin, a third bin and a fourth bin adjacent to the third bin, wherein the first bin is spaced from the third bin with a first division, and the second bin is spaced from the fourth bin with a second division. When the first inert-atmosphere sub-area is referred as the first division, the third air-atmosphere sub-area is the second division. When the first air-atmosphere sub-area is referred as the first division, the third inert-atmosphere sub-area is the said second division.

Further, the first push-equipment set is respectively mounted on the first inert-atmosphere sub-area and the third air-atmosphere sub-area for pushing the bins of the collection-bins set to the second inert-atmosphere sub-area and the second air-atmosphere sub-area. The second push-equipment set is respectively mounted on the first air-atmosphere sub-area and the third inert-atmosphere sub-area for pushing the bins of the collection-bins set to the first inert-atmosphere sub-area and the third air-atmosphere sub-area. The gas-swapping apparatus is used for replacing the atmosphere in the inert atmosphere area with the inert atmosphere.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is featured in installing a plurality of holes on a portion of the tube wall of an inner tube in a vertical tubular reactor and filling a thermal-conductive material between the inner tube and an outer tube, thereby increasing the efficiency for mixing carrier gas and raw material gas, preventing carbon fibers from forming on the tube wall of the inner tube, and increasing heat conduction efficiency.

Figure 2:
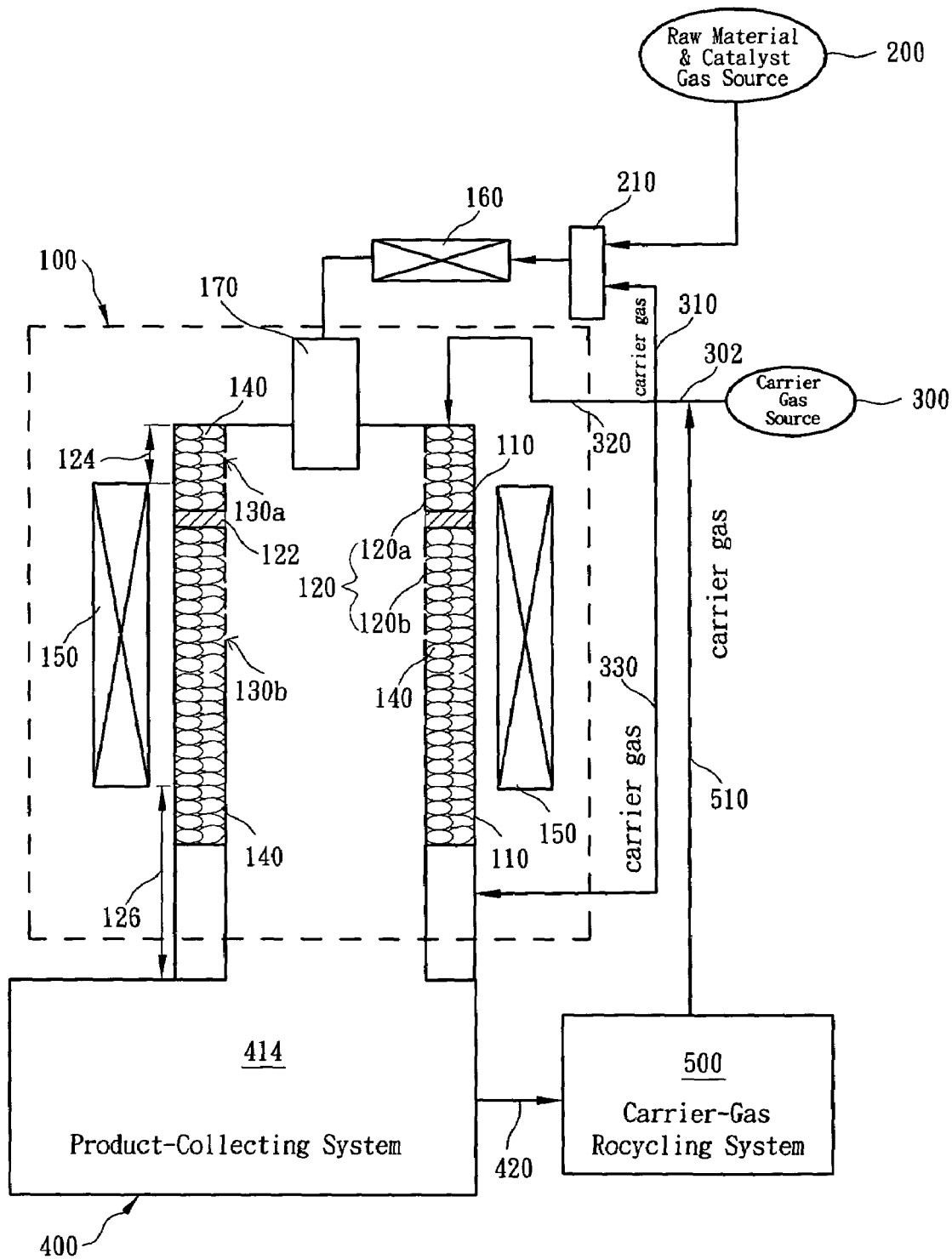
FIG. 2 is a schematic diagram showing a VGCF reaction apparatus according to a preferred embodiment of the present invention.
Figure 3:
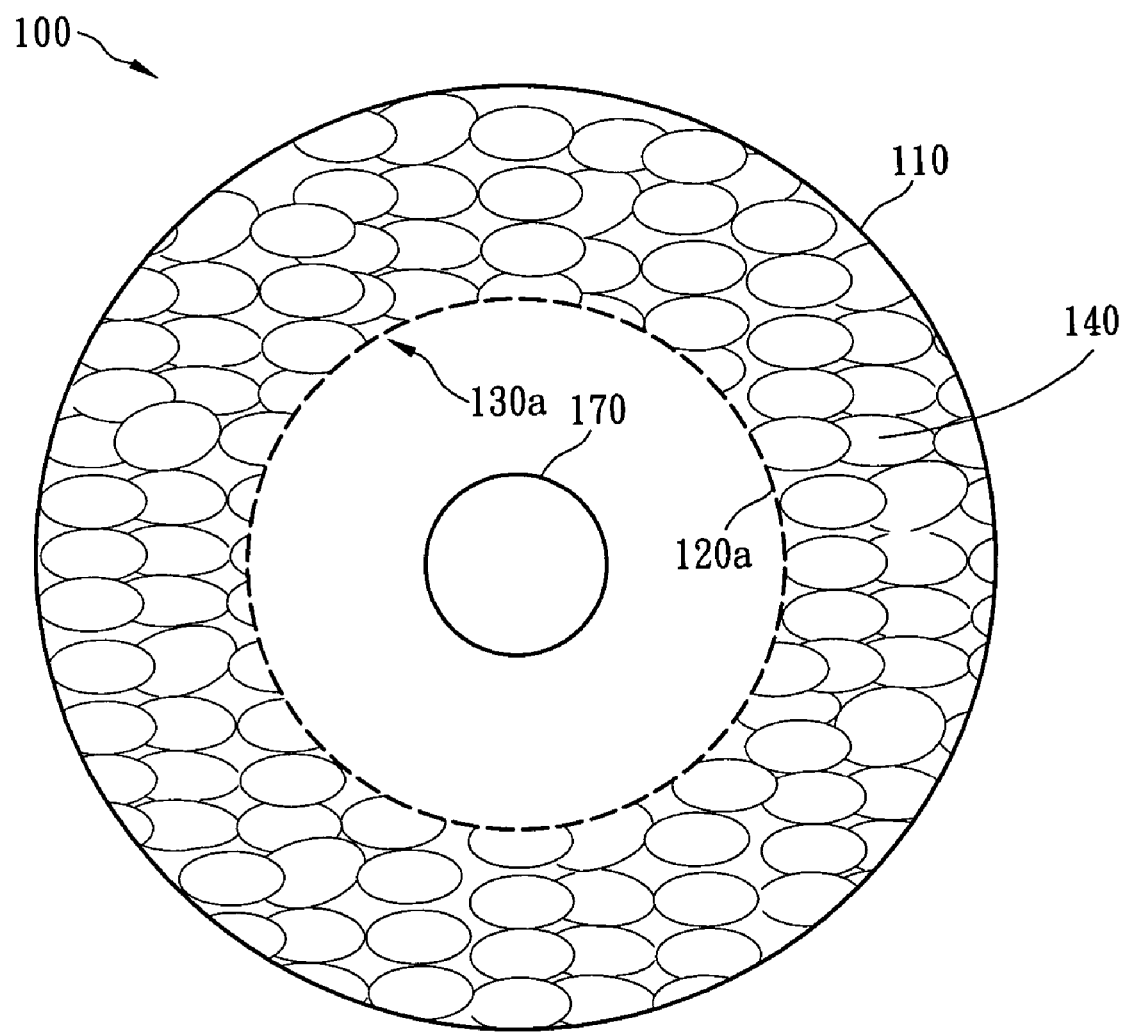
FIG. 3 is a schematic top view showing a vertical tubular reactor according to the preferred embodiment of the present invention.

Referring to FIG. 2 and FIG. 3, FIG. 2 is a schematic diagram showing a VGCF reaction apparatus according to a preferred embodiment of the present invention; and FIG. 3 is a schematic top view showing a vertical tubular reactor according to the preferred embodiment of the present invention. According to the present invention, the vertical tubular reactor (not labeled) is the major part of the reaction apparatus 100 for producing VGCF, and is composed of an outer tube 110 and an inner tube 120. The inner tube 120 is located inside the outer tube 110, and is divided by a division plate 122 into upper and lower inner tubes 120a and 120b, wherein the top end of the inner tube 120a is aligned with the top end of the outer tube 110, and has a guide tube 170 mounted thereon for introducing reaction gas, and the reaction gas includes the raw material gas such as hydrocarbons (for example, aromatic/aliphatic hydrocarbons), the catalyst such as ferrocene ($Fe(C_5H_5)_2$) and the carrier gas such as hydrogen, wherein the aliphatic hydrocarbons include methane, ethylene, styrene, acetylene, propane, liquefied petroleum gas, butane, butene and butadiene, etc., and the aromatic hydrocarbons include benzene, toluene and xylene, etc.

The top end between the inner tube 120a and the outer tube 110 has a gas inlet (not labeled) used for introducing carrier gas (such as hydrogen) via a pipeline 320 for cooling down the top end of the outer tube 110 and the inner tube 120a, thereby preventing sealing material therein from being damaged. Further, the inner tube 120b is located inside the outer tube 110 and below the inner tube 120a, and is spaced from the inner tube 120a at a predetermined distance (i.e. the division plate 122). Besides, the heater 150 is installed externally to the outer tube 110, and both ends of the heater 150 are spaced from both ends of the outer tube 110 respectively at a distance 124 and a distance 126, wherein the heater is only corresponding to a portion of the inner tube 120a and a portion of the inner tube 120b, i.e. the heater 150 merely heats a portion of the outer tube 110. The power of the heater 150 can be such as about 10-50 kW.

One of the features of the present invention is to fill the thermal-conductive material 140 between the inner tube 120a and the outer tube 110; and between the upper portion of the inner tube 120b and the outer tube 110, and a gas inlet (not labeled) is installed on the outer tuber 110 below the thermal-conductive material 140 for introducing carrier gas (such as hydrogen). The thermal conductive material 140 can be such as ceramic, metal, quartz glass or the mixtures thereof. Another feature of the present invention is to install a plurality of holes 130a on the tube wall of the lower portion of the inner tube 120a, and to install a plurality of holes 130b on the tube wall of the upper portion of the inner tube 120b. The length of the filler portion of the thermal-conductive material 140 filled in the inner tube 120b is greater than the length of the holes 130b corresponding to the inner tube 120b.

After the carrier gas enters the area between the inner tube 120b and the outer tube 110 via the pipeline 330, the carrier gas moves upwards into the inner tube 120b through the holes 130b. At this time, since the heat-absorption and heat-transfer rate of the thermal-conductive material 140 are far greater than those of the conventional guide gas, the heat provided by the heater 150 can be effectively utilized. On the other hand, the cold carrier gas from a pipeline 320 enters the inner tube 120b through the holes 130a, wherein the area as shown by the distance 124 is not heated by the heater 150. After reaction gas is formed by mixing the carrier gas from the holes 130a, the raw material gas from the guide tube 170 and the hot carrier gas from the holes 130b, the reaction gas moves downwards to a reaction zone to form carbon fibers by pyrolysis. At this time, the downward reaction gas and the upward hot carrier gas form a counter-flow heat exchange, thereby further effectively utilizing overall heating capacity to heat the carrier gas, thus greatly increasing the temperature of the carrier gas. Thereafter, the carbon fibers generated and the effluent gas move downwards through the cooling zone as shown by the distance 126 (which is not heated by the heater 150), so as to be cooled down properly. Then, the carbon fibers and the effluent gas fall into a bin 414 of a product-collecting system 400, wherein the bin 414 is under inert atmosphere. Since the carrier gas is gradually heated from room temperature between the outer tube 10 and the inner tube 120a/120b, and the reaction gas moves from top to bottom in the inner tube 120a/120b for exchanging heat with the carrier gas, and additionally the aforementioned cooling zone is employed, the temperature of the carbon fibers and effluent gas in the bin 414 of the product-collecting system 400 is effectively lowered.

To sum up, the present invention provides an excellent heat transfer effect in which reaction gas is cooled on both ends of the vertical tubular reactor and heated with reaction at the central portion thereof. It is worthy to be noted that the holes 130a and 130b can direct the carrier gas to the center of the inner tube of the reaction apparatus 100, thereby increasing the effect for mixing carrier gas, raw material gas (hydrocarbons, catalyst and carrier gas), and meanwhile, the carrier gas injecting through the holes 130a and 130b can effectively avoiding carbon fibers growing on the tube wall of the inner tube.

The product-collecting system 400 is connected to a carrier-gas recycling system 500 via a pipeline 420 for recycling the carrier gas in the effluent gas. The carrier gas recycled then enters a pipeline 302 via a pipeline 510. After mixing with the carrier gas provided from a carrier gas source 300, the carrier gas is divided into three portions respectively entering a mixer 210 and the vertical tubular reactor via pipelines 310, 320 and 330. The carrier gas entering the mixer 210 is mixed with the mixture gas provided by a raw material/catalyst gas source 200 so as to form reaction gas, wherein the reaction gas can be pre-heated by a pre-heater 160 before entering the inner tuber 120a.

Further, the inner and outer tubes of the vertical tubular reactor can be circular tubes as shown in FIG. 3, and the material thereof can be such as aluminum oxide, silicon carbide, quartz, mullite or silicon nitride. However, the inner and outer tubes of the vertical tubular reactor also can be in the other shapes such as square tubes, and the material thereof also can be other material. Therefore, the present invention is not limited thereto.

Figure 4:
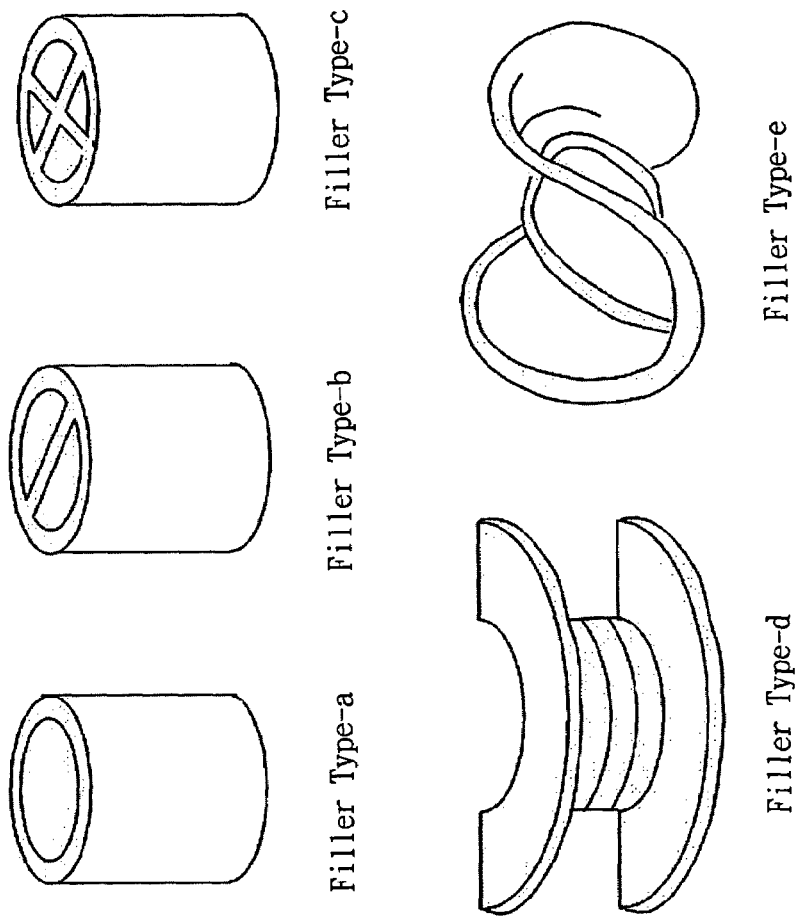
FIG. 4 is a schematic diagram showing various types of thermal-conductive material according to the present invention.

Further, referring to FIG. 4, FIG. 4 is a schematic diagram showing various types of thermal-conductive material according to the present invention.

Hereinafter, a process example of the present invention and a conventional comparison example are used for explanation.

Process Example of the Present Invention

In the VGCF reaction apparatus 100 as shown in FIG. 2, VGCF is fabricated under the following conditions.

At first, raw material gas is delivered from the raw material/catalyst gas source 200 to the mixer 210 and is uniformly mixed with a portion of carrier gas, the reaction gas composed of the raw material gas and the carrier gas is delivered to the pre-heater 160 for pre-heating to 300° C. Thereafter, the reaction gas pre-heated is introduced into the reaction tube via the guide tube 170 for reaction, and meanwhile, the other portions of the carrier gas are delivered respectively to the area between the inner tubes 120a/120b and the outer tube 110; to the thermal-conductive material 140 between the inner tube and the outer tube 110 via the pipelines 320 and 330, while the heater 150 is heating the outer tube 110 and the thermal-conductive material 140. After being heated by the thermal-conductive material 140, the carrier gas injects into the inner tubes 120a and 120b through the holes 130a and 130b. The VGCF product generated is collected by the product-collecting system 400, and the effluent gas is recycled by the carrier-gas recycling system 500.

The specification and operation conditions of the reaction apparatus 100 and the results thereof are listed as follows:

(1) inner tube 120: a quartz tube of 20 cm inner diameter; 24 cm outer diameter; and 200 cm long;
(2) outer tube 110: a quartz tube of 30 cm inner diameter; 34 cm outer diameter; and 200 cm long;
(3) holes 130a: location: spaced from the top end of the reaction tube at the distance of 35 cm; extending downwards for 15 cm; hole size: 2 mm diameter; hole distance: 1 cm;
(4) holes 130b: location: spaced from the top end of the reaction tube at the distance of 51 cm; extending downwards for 30 cm; hole size: 2 mm diameter; hole distance: 1 cm;
(5) division plate 122: a quartz ring of 20 cm inner diameter; 30 cm outer diameter; and 1 cm thick; location: spaced from the top end of the reaction tube at the distance of 50-51 cm;
(6) thermal-conductive material 140: quartz material; filler type-a as shown in FIG. 4 (0.8 cm inner diameter; 1.0 cm outer diameter; and 1.2 cm long);
(7) heater 150: 1200° C. control temperature;
(8) Raw material gas supply: reaction material composition: 96 wt % xylene and 4 wt % ferrocene; reaction material flow rate: 60 ml/min (liquid phase at 25° C., 1 ATM; entering the reaction system after vaporization);
(9) carrier gas: hydrogen; flow rates: 20 L/min (via the guide tube 170), 30 L/min (via the holes 130a); and 100 L/min (via the holes 130b); reaction time: two hours;
(10) products: 2.52 Kg (45% yield; no carbon fibers attached to the tube wall); wherein the average diameter of the carbon fibers is 200 nm.

Figure 5:
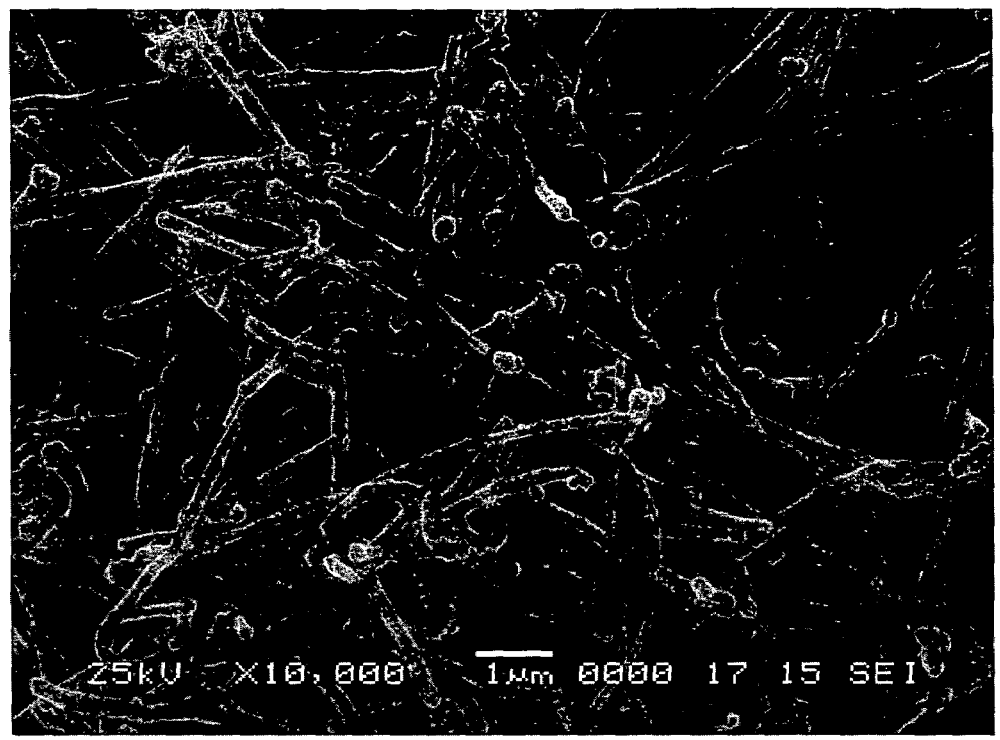
FIG. 5 is a SEM(JEOL JSM6360) diagram of the product manufactured in accordance with the process example of the present invention.

Referring to FIG. 5, FIG. 5 is a SEM(JEOL JSM6360) diagram of the product manufactured in accordance with the process example of the present invention. It can be known from FIG. 5 that the purity of the products generated in the process example of the present invention is quite high.

Conventional Comparison Example

Figure 1A:
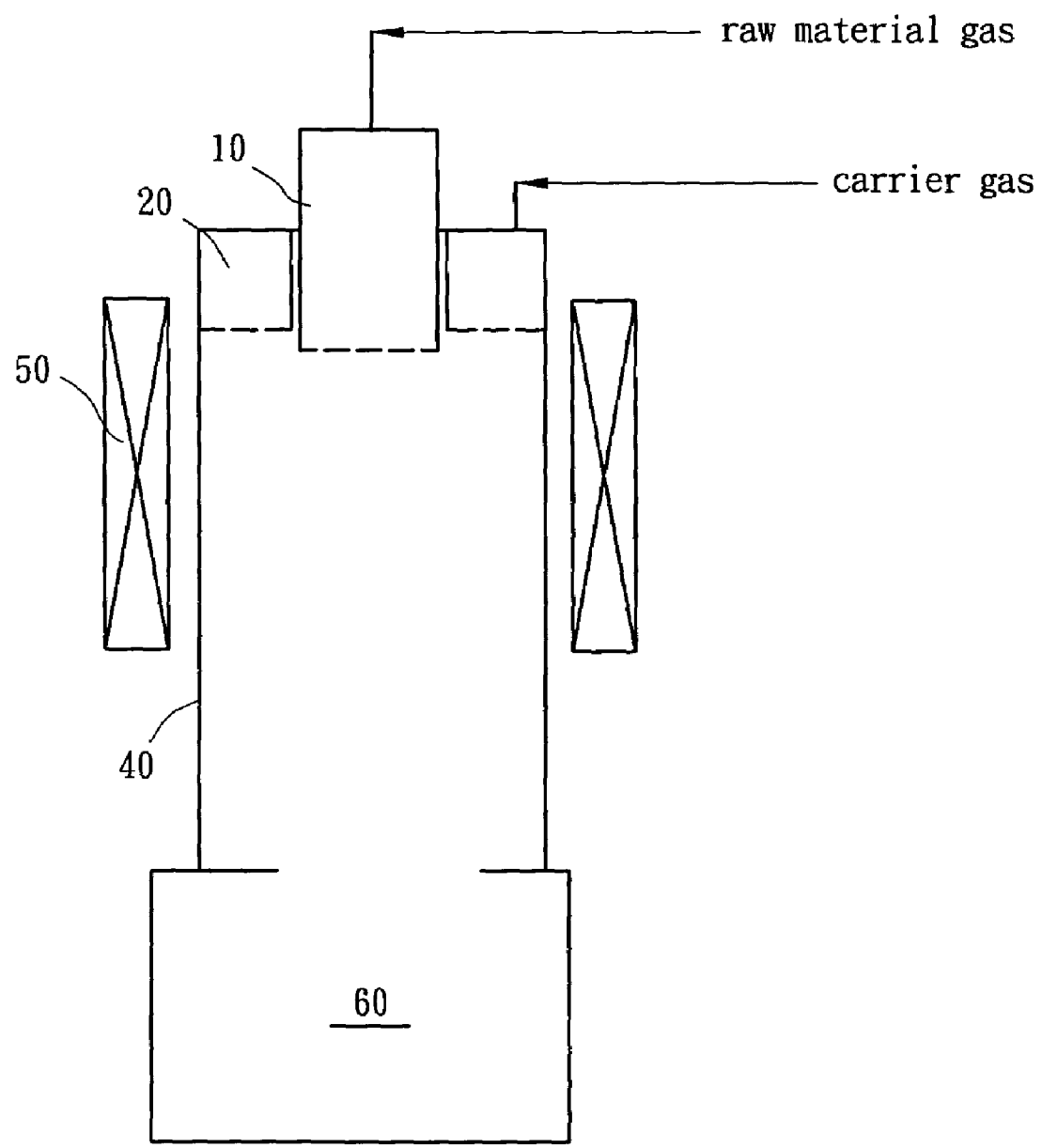
FIG. 1A and FIG. 1B are schematic diagrams showing conventional VGCF reaction apparatuses respectively.
Figure 1B:
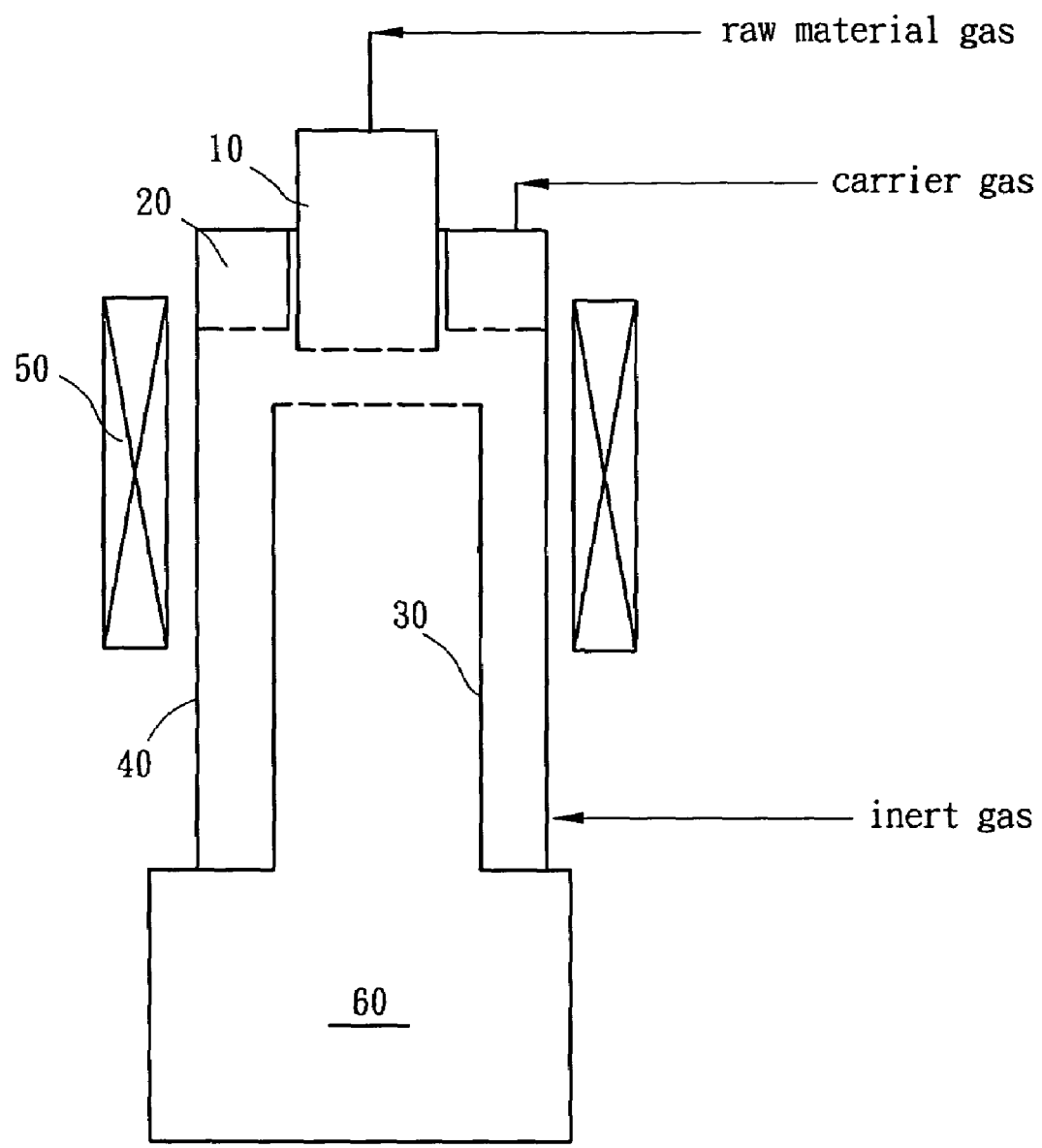

In the reaction apparatus as shown in FIG. 1A, raw material gas and a portion of carrier gas are introduced into the reaction tube via the guide tube 10, and meanwhile, the other portions of the carrier gas are introduced to the reaction tube via the gas inlet 20, and the heater 50 heats the tube externally, and the product generated is collected by the collection bin 60.

The specification and operation conditions of the conventional comparison example and the results thereof are listed as follows:

(1) reaction tube 40: a quartz tube of 20 cm inner diameter; 24 cm outer diameter; and 200 cm long;
(2) heater 50: 1200° C. control temperature;
(3) Raw material gas supply: reaction material composition: 96 wt % xylene and wt % ferrocene; reaction material flow rate: 60 ml/min (liquid phase at 25° C., 1 ATM; entering the reaction system after vaporization);
(4) carrier gas: hydrogen; flow rates: 20 L/min (via the guide tube 10) and 130 L/min (via the gas inlet 20)
(5) reaction time: two hours;
(6) products: 0.84 Kg (about 15% yield; a lot of carbon fibers attached to the tube wall); wherein the average diameter of the carbon fibers is 300 nm.

Figure 6:
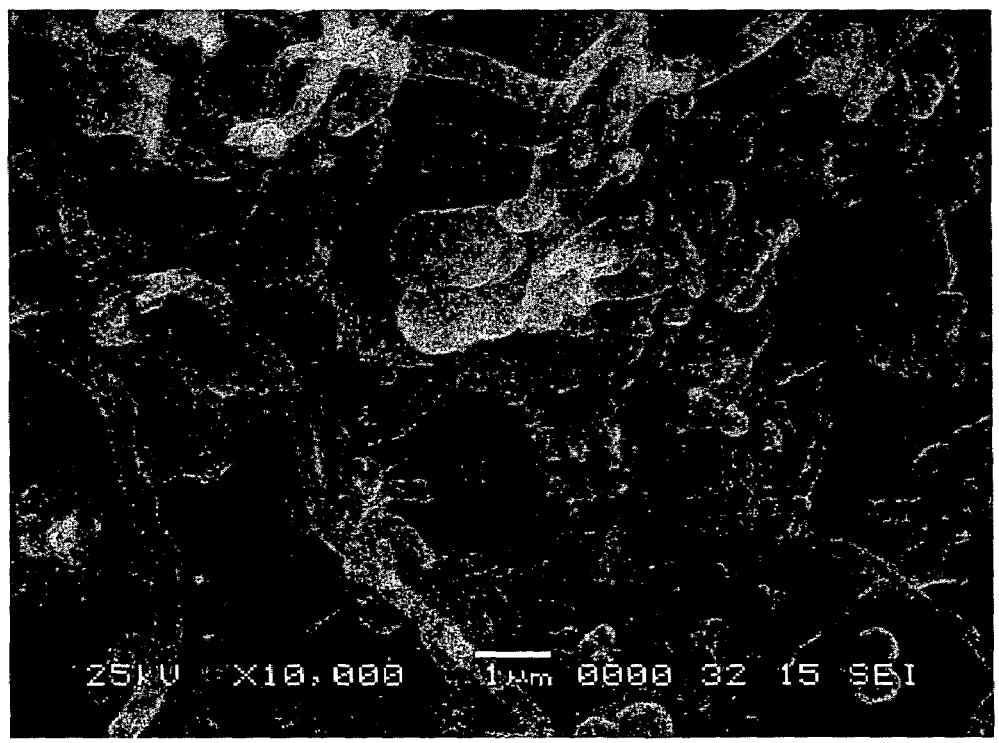
FIG. 6 is a SEM(JEOL JSM6360) diagram of the product manufactured in accordance with the conventional comparison example.

Referring to FIG. 6, FIG. 6 is a SEM(JEOL JSM6360) diagram the products manufactured in accordance with the conventional comparison example. It can be known from FIG. 6 that there are quite a lot of non-fiber impurities existing in the products generated in the conventional comparison example.

Figure 7:
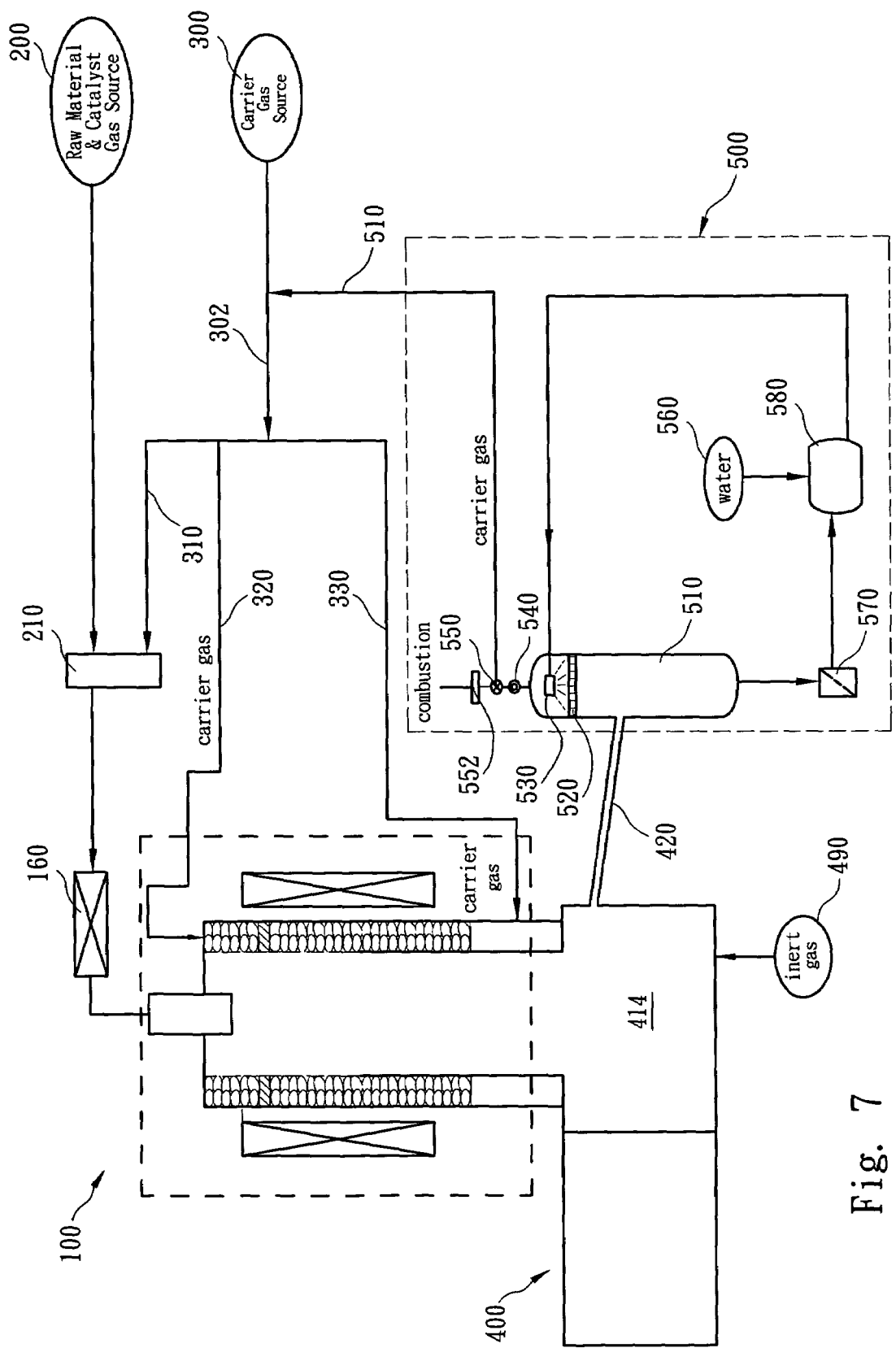
FIG. 7 is a schematic diagram showing a VGCF production system according to the preferred embodiment of the present invention.

Moreover, other important features of the present invention reside in the product-collecting system 400 and the carrier-gas recycling system 500. Referring to FIG. 7, FIG. 7 is a schematic diagram showing a VGCF production system according to the preferred embodiment of the present invention. The carrier-gas collecting system 500 is connected to the product-collecting system 400 via the pipeline 420 for collecting and purifying carrier gas from the effluent gas expelled from the product-collecting system 400 by water-washing. In the carrier-gas collecting system 500, a water-washing vessel 510 is used to provide a water flow for washing the effluent gas therein via a spray head 530 and a distribution plate 520, so as to separate a residual product from carrier gas in the effluent gas. Then, the residual product enters a filter 570 connected to the bottom of the water-washing vessel 510 so as to separate residual solids from water. Thereafter, the water filtered out returns to a water-storage vessel 580. If the water level in the water-storage vessel 580 is too low, water source 560 supplies water to bring back the water level. On the other hand, a fan 540 is installed on the top of the water-washing vessel 510 for withdrawing the effluent carrier gas formed after water washing. The fan 540 is connected to a switching device 550 used for determining the ultimate treatment of the effluent carrier gas: either recycling the recyclable carrier gas back to the reaction apparatus 100, or burning the effluent carrier gas with a combustion device 552 connected to the fan 540.

Figure 8A:
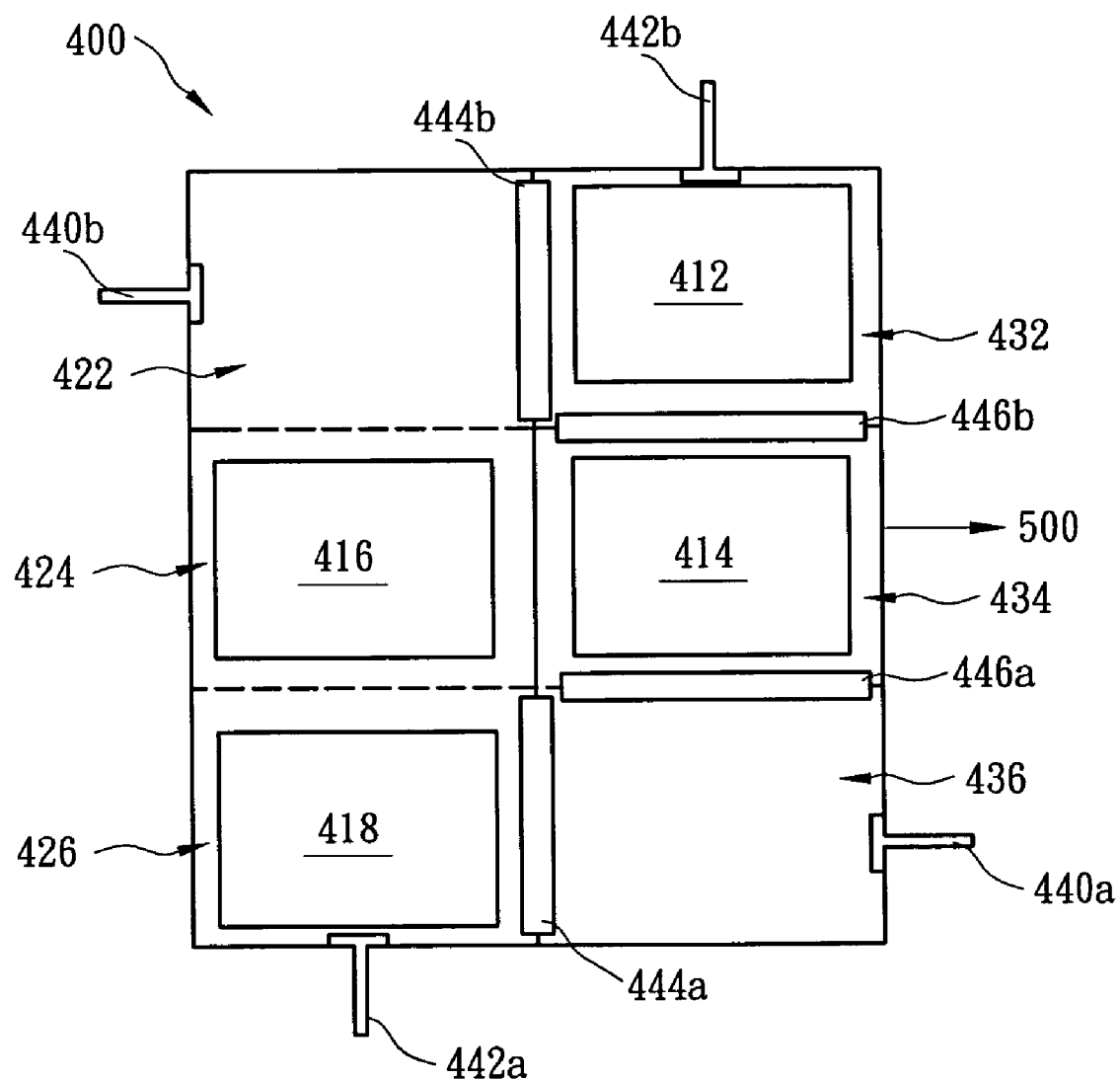
FIG. 8A to FIG. 8C are schematic diagrams showing the steps for collecting VGCF according to the preferred embodiment of the present invention.
Figure 8B:
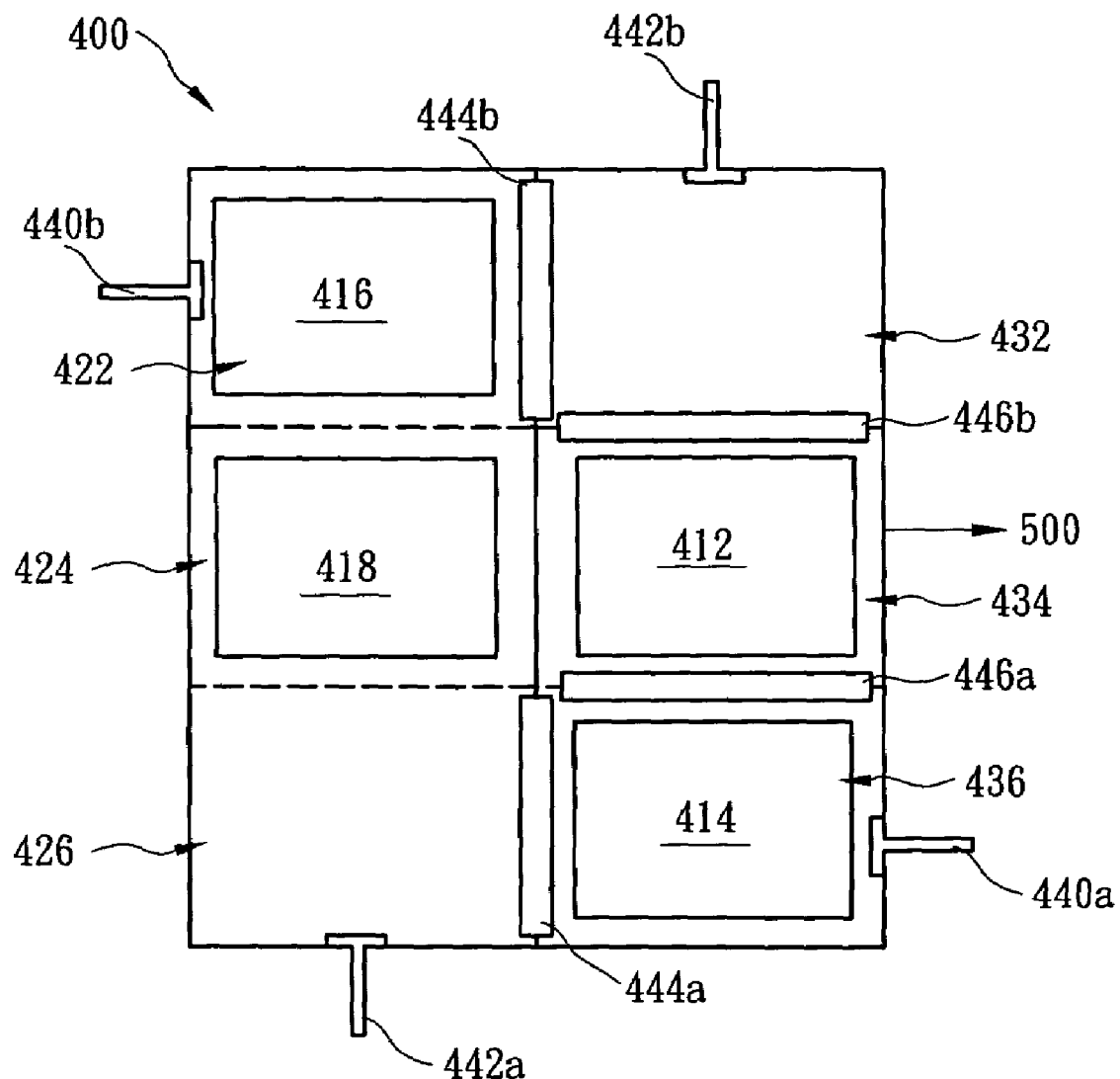
Figure 8C:
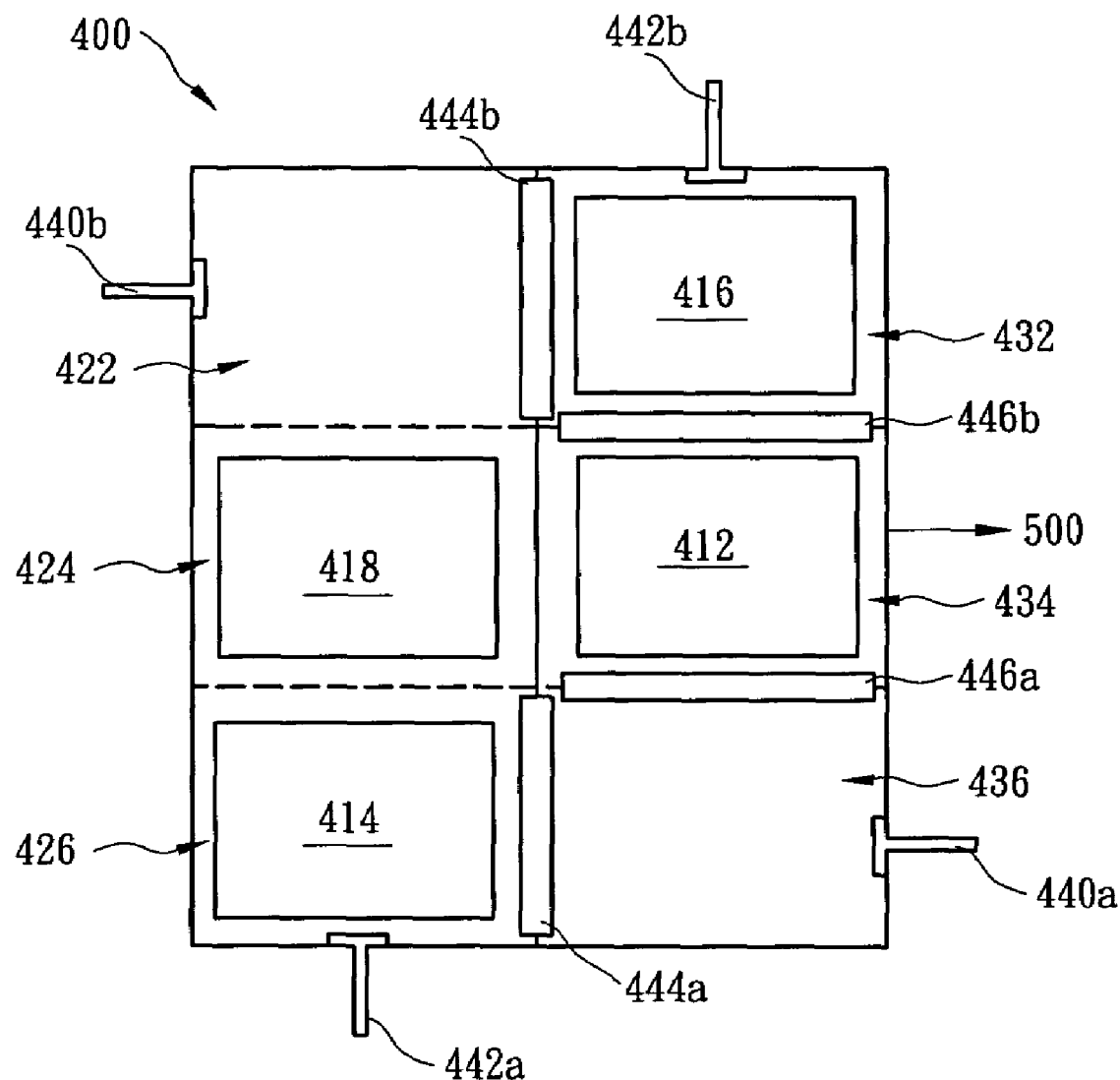

As to another feature of the present invention with respect to continuously collecting the products of carbon fibers by a dry-collection method, please refer to FIG. 8A to FIG. 8C, wherein FIG. 8A to FIG. 8C are schematic diagrams showing the steps for collecting VGCF according to the preferred embodiment of the present invention. The product-collecting system 400 is to move a collection-bins set circulatively in a circulating rooms set, wherein the circulating rooms set is divided into an air atmosphere area and an inert atmosphere area. At first, the air atmosphere area is divided into an air-atmosphere sub-area 422, an air-atmosphere sub-area 424 and an air-atmosphere sub-area 426; and the inert atmosphere area is divided into an inert-atmosphere sub-area 432, an inert-atmosphere sub-area 434 and an inert-atmosphere sub-area 436. Both opposite sides of the air-atmosphere sub-area 424 are open respectively to the air-atmosphere sub-area 422 and the air-atmosphere sub-area 426, and the inert-atmosphere sub-area 434 is isolated from the air-atmosphere sub-area 424, and the inert-atmosphere sub-area 434 is open to the reaction apparatus 100 (shown in FIG. 7) for collecting the VGCF generated from the reaction apparatus 100. The inert-atmosphere sub-area 434 is also open to the carrier-gas collecting system 500 for recycling the carrier gas in the effluent gas.

Such as shown in FIG. 8A, the collection-bins set is composed of a bin 412, a bin 414, a bin 416 and a bin 418, wherein the bin 412 is adjacent to the bin 414, and the bin 416 is adjacent to the bin 418, and the bin 412 is spaced from the bin 416 with the air-atmosphere sub-area 422, and the bin 414 is spaced from the bin 418 with the inert-atmosphere sub-area 436. On the other hand, the positional relationship among those four bins also can be such as shown in FIG. 8B, wherein the bin 412 is spaced from the bin 416 with the inert-atmosphere sub-area 432, and the bin 414 is spaced from the bin 418 with the air-atmosphere sub-area 426.

Further, a gate 446b is mounted between one side of the inert-atmosphere sub-area 434 and the inert-atmosphere sub-area 432, and a gate 446a is mounted between the inert-atmosphere sub-area 436 and the other side of the inert-atmosphere sub-area 434 opposite to the gate 446b, wherein the gate 446a and the gate 446b can be opened simultaneously. A gate 444b is mounted between the inert-atmosphere sub-area 432 and the air-atmosphere sub-area 422, and a gate 444a is mounted between the inert-atmosphere sub-area 436 and the air-atmosphere sub-area 426, wherein the gate 444a and the gate 444b can be opened simultaneously.

Further, pushers 442a and 442b (one push-equipment set) are respectively mounted on the inert-atmosphere sub-area 432 and the air-atmosphere sub-area 426, and pushers 440a and 440b (the other push-equipment set) are respectively mounted on the inert-atmosphere sub-area 436 and the air-atmosphere sub-area 422. The pushing directions of the pushers 442a and the 442b are opposite to each other, and so are the pushing directions of the pushers 440a and the 440b. All four pushers 442a, 442b, 440a and 440b form a cross shape, and can adopt such as hydraulic tanks to move the bins.

Further, a gas-swapping apparatus 490 (shown in FIG. 7) is used for replacing the atmosphere in the inert atmosphere area with the inert atmosphere such as nitrogen atmosphere, wherein the gas-swapping apparatus 490 is composed of a vacuuming device and an inert-gas input device (not shown).

Hereinafter, the steps for operating the product-collecting system 400 are explained with reference to FIG. 8A to FIG. 8C.

Referring to FIG. 8A, when the bin 414 located at the inert-atmosphere sub-areas 434 is loaded with VGCF (at this point, the gates 446a and 446b are closed), since the bin 414 has been filled with the carrier gas such as hydrogen susceptible to explosion, the inert-atmosphere sub-areas 432 and 436 have to be vacuumed by using the vacuuming device so as to expel the air therein before the gates 446a and 446b are opened. Then, the inert-gas input device is used to fill the inert gas in the inert-atmosphere sub-areas 432 and 436.

Thereafter, the gates 446a and 446b are opened, and then the pusher 442b is used to push and move the bin 412 from the inert-atmosphere sub-area 432 to the inert-atmosphere sub-area 434, thereby causing the bin 412 to push the bin 414 from the inert-atmosphere sub-area 434 to the inert-atmosphere sub-area 436; and meanwhile, the pusher 442a is used to push and move the bin 418 from the air-atmosphere sub-area 426 to the air-atmosphere sub-area 424, thereby causing the bin 418 to push the bin 416 from the air-atmosphere sub-area 424 to the air-atmosphere sub-area 422, wherein the positional relationship of the four bins is such as shown in FIG. 8B.

Please continuously referring to FIG. 8B. Thereafter, the gates 446a and 446b are closed, and then the vacuuming device is activated to vacuum the inert-atmosphere sub-areas 432 and 436 so as to expel the atmosphere therein, and then the inert-gas input device is used to fill the inert gas in the inert-atmosphere sub-areas 432 and 436. Thereafter, the gates 444a and 444b are opened, and then the pusher 440b is used to push and move the bin 416 from the air-atmosphere sub-area 422 to the inert-atmosphere sub-area 432; and meanwhile the pusher 440a is used to push and move the bin 414 from the inert-atmosphere sub-area 436 to the air-atmosphere sub-area 426, wherein the positional relationship of the four bins is such as shown in FIG. 8C. Consequently, the bin 414 loaded with the VGCF is moved out and the empty bin 412 is moved into the collection room (i.e. the inert-atmosphere sub-area 434), thereby keeping the collection room on the status ready for collecting the products.

After the bin 412 is loaded with the VGCF, the aforementioned steps can be repeated for moving the loaded bin 412 out of the collection room and moving another empty bin 416 into the collection room, thereby achieving the purpose of continuously collecting the VGCF (products). The product-collecting system of the present invention can be further operated with appropriate instrumentation and control facility for continuously collecting the VGCF (products), thereby not only promotion productivity but also greatly enhancing factory safety.

It is worthy to be noted that the shapes and allocation of the circulating rooms set are merely stated as examples for explanation, and the present invention is not limited thereto.

Hence, it can be known from the aforementioned embodiments that the present invention has the advantages of effectively utilizing the energy provided by the heater; preventing carbon fibers from attaching to the tube wall of the inner tube; continuously collecting products (VGCF) without stopping the reaction apparatus; and effectively recycling carrier gas, thus increasing productivity; easily cleaning the reaction tubes; preventing pollution and workforce waste; and lowering production cost.

As is understood by a person skilled in the art, the foregoing preferred embodiments are illustrations rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A reaction apparatus for producing vapor-grown carbon fibers (VGCF), comprising:
   a vertical tubular reactor, comprising:
      an outer tube;
      a first inner tube located in said outer tube, wherein one end of said first inner tube is aligned with one end of said outer tube, and there are a plurality of first holes distributed on the tube wall of said first inner tube, and said one end of said first inner tube has a first gas inlet used for introducing raw material gas;
      a second inner tube located below said first inner tube in said outer tube, wherein there are a plurality of second holes distributed on the tube wall of an upper portion of said second inner tube; and
      a thermal-conductive material filled in a filler portion extending from the area between said first inner tube and said outer tube to the area between said second inner tube and said outer tube, wherein said outer tube has a second gas inlet located on below said thermal-conductive material for introducing first carrier gas; and
   a heater installed externally to said outer tube for heating a portion of said outer tube.

2. The reaction apparatus of claim 1, wherein said first inner tube is spaced from said second inner tube at a predetermined distance.

3. The reaction apparatus of claim 1, wherein said first inner tube and said second inner tube are separated from each other with a division plate.

4. The reaction apparatus of claim 1, wherein there is a third gas inlet located on said one end of said outer tube, and said third gas inlet is located between said outer tube and said first inner tube for introducing second carrier gas to cool down the upper end of said outer tube and said first inner tube.

5. The reaction apparatus of claim 4, wherein said first carrier gas and said second carrier gas are hydrogen.

6. The reaction apparatus of claim 1, wherein both ends of said heater are respectively spaced from both ends of said outer tube at a first predetermined distance and a second predetermined distance, and said heater is corresponding to a portion of said first inner tube and a portion of said second inner tube.

7. The reaction apparatus of claim 1, wherein the length of said filler portion corresponding to said second inner tube is greater than the length of said second holes corresponding to said second inner tube.

8. The reaction apparatus of claim 1, further comprising:
   a pre-heater located outside the vertical tubular reactor, wherein said pre-heater is connected to said first gas inlet for pre-heating said raw material gas.

9. The reaction apparatus of claim 1, wherein said raw material gas comprises a hydrocarbon compound, a catalyst and a third carrier gas.

10. The reaction apparatus of claim 9, wherein said third carrier gas is hydrogen.

11. The reaction apparatus of claim 1, wherein said thermal conductive material is selected from the group consisting of ceramic, metal, quartz glass and the mixtures thereof.

12. The reaction apparatus of claim 1, wherein said outer rube, said first inner tube and said second inner tube are made of the material selected from the group consisting of aluminum oxide, silicon carbide, quartz, mullite and silicon nitride.

13. A continuous production system for producing VGCF, comprising:
   a reaction apparatus comprising a vertical tubular reactor and a heater, wherein reaction gas formed by mixing raw material gas with carrier gas is introduced into said reaction apparatus for producing said VGCF via pyrolysis with effluent gas remaining, said vertical tubular reactor comprising:
      an outer tube, wherein said heater is installed externally to said outer tube for heating a portion of said outer tube;
      a first inner tube located in said outer tube, wherein one end of said first inner tube is aligned with one end of said outer tube, and there are a plurality of first holes distributed on the tube wall of said first inner tube, and said one end of said first inner tube has a first gas inlet used for introducing raw material gas;
      a second inner tube located below said first inner tube in said outer tube, wherein there are a plurality of second holes distributed on the tube wall of an upper portion of said second inner tube; and
      a thermal-conductive material filled in a filler portion extending from the area between said first inner tube and said outer tube to the area between said second inner tube and said outer tube, wherein said outer tube has a second gas inlet located on below said thermal-conductive material for introducing first carrier gas;
   a product-collecting system connected to the lower end of said second inner tube or continuously collecting said VGCF by using a dry-collection method, wherein said product-collecting system comprises:
      a circulating rooms set divided into an air atmosphere area and an inert atmosphere area; and
      a collection-bins set having a plurality of bins, wherein said bins move circulatively in said air atmosphere area and said inert atmosphere area; and
   a carrier-gas collecting system connected to said product-collecting system for collecting and purifying recyclable carrier gas from said effluent gas expelled from said product-collecting system by water-washing, said carrier-gas collecting system comprising:
      a water-washing vessel, wherein a water flow is introduced into said water-washing vessel for washing said effluent gas so as to obtain a residual product and said recyclable carrier gas.

14. The continuous production system of claim 13, wherein said air atmosphere area is divided into a first air-atmosphere sub-area, a second air-atmosphere sub-area and a third air-atmosphere sub-area; and said inert atmosphere area is divided into a first inert-atmosphere sub-area, a second inert-atmosphere sub-area and a third inert-atmosphere sub-area, wherein both opposite sides of said second air-atmosphere sub-area are open respectively to said first air-atmosphere sub-area and said third air-atmosphere sub-area, and said second inert-atmosphere sub-area is isolated from said second air-atmosphere sub-area, and said second inert-atmosphere sub-area is open to said reaction apparatus for collecting said VGCF; and said bins are a first bin, a second bin adjacent to said first bin, a third bin and a fourth bin adjacent to said third bin, and said first bin is spaced from said third bin with a first division, and said second bin is spaced from said fourth bin with a second division, wherein when said first division is said first inert-atmosphere sub-area, said second division is said third air-atmosphere sub-area; and, when said first division is said first air-atmosphere sub-area, said second division is said third inert-atmosphere sub-area, said product-collecting system further comprising:

a first gate mounted between one side of said second inert-atmosphere sub-area and said first inert-atmosphere sub-area;

a second gate mounted between said third inert-atmosphere sub-area and the other side of said second inert-atmosphere sub-area opposite to said first inert-atmosphere sub-area;

a third gate mounted between said first inert-atmosphere sub-area and said first air-atmosphere sub-area;

a fourth gate mounted between said third inert-atmosphere sub-area and said third air-atmosphere sub-area;

a first push-equipment set respectively mounted on said first inert-atmosphere sub-area and said third air-atmosphere sub-area for pushing the bins of said collection-bins set to said second inert-atmosphere sub-area and said second air-atmosphere sub-area;

a second push-equipment set respectively mounted on said first air-atmosphere sub-area and said third inert-atmosphere sub-area for pushing the bins of said collection-bins set to said first inert-atmosphere sub-area and said third air-atmosphere sub-area; and a gas-swapping apparatus used for replacing the atmosphere in said inert atmosphere area with an inert atmosphere.

15. The continuous production system of claim 14, wherein said inert atmosphere is nitrogen atmosphere.

16. The continuous production system of claim 13, wherein said first push-equipment set is composed of a pair of first pushing devices of which the pushing directions are opposite, and said second push-equipment set is composed of a pair of second pushing devices of which the pushing directions are opposite.

17. The continuous production system of claim 13, wherein said first gate and said second gate are opened simultaneously.

18. The continuous production system of claim 13, wherein said third gate and said fourth gate are opened simultaneously.

19. The continuous production system of claim 13, wherein said carrier-gas collecting system further comprises:

a fan mounted on the top of said water-washing vessel for withdrawing said recyclable carrier gas out of said water-washing vessel; and a filter connected to the bottom of said water-washing vessel for separating water content from residual solids in said residual product.

20. The continuous production system of claim 19, wherein said carrier-gas collecting system further comprises:

a combustion device connected to said fan for combusting said recyclable carrier gas.

* * * * *